United States Patent
Achamola et al.

(10) Patent No.: US 10,187,870 B1
(45) Date of Patent: Jan. 22, 2019

(54) SYSTEMS AND METHODS FOR INTELLIGENT ROUTING OF NOTIFICATIONS OF INCOMING VOICE COMMUNICATION REQUESTS

(71) Applicant: QUALCOMM Incorporated, San Diego, CA (US)

(72) Inventors: Sravan Kumar Reddy Achamola, Hyderabad (IN); Kiran Koona, Miyapur (IN); Ravi Teja Mandavilli, Bangalore (IN); Venkata SubbaRao Annam, Hyderabad (IN); Tejasree Depa, Hyderabad (IN); Prapulla Vuppu, Secunderabad (IN); Venkata Naga Poleswara Rao Karuchula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/656,875

(22) Filed: Jul. 21, 2017

(51) Int. Cl.
*H04W 68/00* (2009.01)
*H04W 68/02* (2009.01)

(52) U.S. Cl.
CPC ......... *H04W 68/005* (2013.01); *H04W 68/02* (2013.01)

(58) Field of Classification Search
CPC .............................. H04W 68/02; H04W 68/005
See application file for complete search history.

(56) References Cited

U.S. PATENT DOCUMENTS

| | | |
|---|---|---|
| 9,226,101 B1 | 12/2015 | Ludwig et al. |
| 2010/0074430 A1 | 3/2010 | Turcan et al. |
| 2013/0301813 A1* | 11/2013 | Shaffer ............... G06Q 10/107 379/88.01 |
| 2014/0065997 A1* | 3/2014 | Walker .................... H04W 4/90 455/404.1 |
| 2014/0086107 A1 | 3/2014 | Shi |
| 2014/0376703 A1 | 12/2014 | Timem et al. |
| 2015/0026580 A1* | 1/2015 | Kang ..................... G06F 3/167 715/728 |
| 2015/0310444 A1 | 10/2015 | Chen et al. |
| 2017/0026974 A1* | 1/2017 | Dey ...................... H04W 4/025 |

* cited by examiner

*Primary Examiner* — Wayne H Cai
(74) *Attorney, Agent, or Firm* — Kilpatrick Townsend & Stockton/Qualcomm

(57) ABSTRACT

This disclosure provides systems, methods and apparatus, including computer programs encoded on computer storage media for intelligent routing of notifications of incoming voice communication requests. A device, such as a smartphone, may receive an incoming voice communication request, such as a cellular voice call. The smartphone may then identify devices connected to it, such as headsets, tablets, etc., and request each device activate a microphone or camera to attempt to locate the user with respect to the connected devices. The smartphone may then select one of the connected devices, or itself, as the device best able to notify the user of the incoming call based on captured audio, images, or video. The smartphone may then request the selected device output a notification, such as a ring tone, to notify the user of the incoming call. Such a technique may avoid inundating the user with simultaneous call notifications from multiple devices.

26 Claims, 7 Drawing Sheets

SYSTEMS AND METHODS FOR INTELLIGENT ROUTING OF NOTIFICATIONS OF INCOMING VOICE COMMUNICATION REQUESTS

TECHNICAL FIELD

This disclosure relates to voice and video communications using electronic devices, and more specifically relates to systems and methods for intelligent routing of notifications of incoming voice communication requests.

DESCRIPTION OF THE RELATED TECHNOLOGY

As users begin to acquire more Internet-of-Things ("IOT") devices, some of them will include functionality to allow a user to engage in audio or video communications. For example, a user may engage in traditional cellular or wired phone calls by connecting an IOT device to the user's smartphone or home phone and communicating via the connected IOT device. In a scenario where multiple IOT devices are suitable for providing such communications, when an incoming phone call is detected at the user's smartphone, for example, the smartphone can notify each of these IOT devices of the incoming call, thereby causing them to ring to notify the user of the incoming call.

SUMMARY

The systems, methods and devices of this disclosure each have several innovative aspects, no single one of which is solely responsible for the desirable attributes disclosed herein.

Various examples are described for systems and methods for intelligent routing of notifications of incoming voice communication requests. One innovative aspect of the subject matter described in this disclosure can be implemented in a method including receiving, by an electronic device, an indication of an incoming voice communication request; in response to the indication and before requesting a device to output a notification: identifying one or more devices connected to the electronic device, each of the one or more devices including an audio input device and an audio output device; requesting each identified device to detect audio signals using its respective audio input device; receiving a voice based on a first audio signal, the first audio signal received by one of the one or more devices; selecting a first device of the one or more devices based on the voice; and providing a signal to the first device to output a notification indicating the incoming voice communication request.

Another innovative aspect of the subject matter described in this disclosure can be implemented in a non-transitory computer-readable medium including processor-executable program code configured to cause a processor to receive an indication of an incoming voice communication request; in response to the indication and before requesting a device to output a notification: identify one or more devices connected to the electronic device, each of the one or more devices including an audio input device and an audio output device; request each identified device to detect audio signals using its respective audio input device; receive a voice based on a first audio signal, the first audio signal received by one of the one or more devices; select a first device of the one or more devices based on the voice; and provide a signal to the first device to output a notification indicating the incoming voice communication request.

Another innovative aspect of the subject matter described in this disclosure can be implemented in a device including a microphone; a speaker; a network interface; a non-transitory computer-readable medium; and a processor in communication with the microphone, the speaker, the network interface, and the non-transitory computer-readable medium, and configured to execute processor-executable program code stored in the non-transitory computer-readable medium configured to cause the processor to: receive an indication of an incoming voice communication request via the network interface; in response to the indication and before requesting a device to output a notification: identify one or more devices connected to the electronic device, each of the one or more devices including an audio input device and an audio output device; request each identified device to detect audio signals using its respective audio input device; receive a voice based on a first audio signal, the first audio signal received by one of the one or more devices; select a first device of the one or more devices based on the voice; and provide a signal to the first device to output a notification indicating the incoming voice communication request.

Another innovative aspect of the subject matter described in this disclosure can be implemented in an apparatus including means for receiving an indication of an incoming voice communication request; means for identifying one or more devices connected to the apparatus in response to the indication and before requesting a device to output a notification, each of the one or more devices including an audio input device and an audio output device; means for requesting each identified device to detect audio signals using its respective audio input device in response to the indication and without outputting the notification; means for receiving a voice based on a first audio signal, the first audio signal received by one of the one or more devices; means for selecting a first device of the one or more devices based on the voice; and means for providing a signal to the first device to output a notification indicating the incoming voice communication request.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
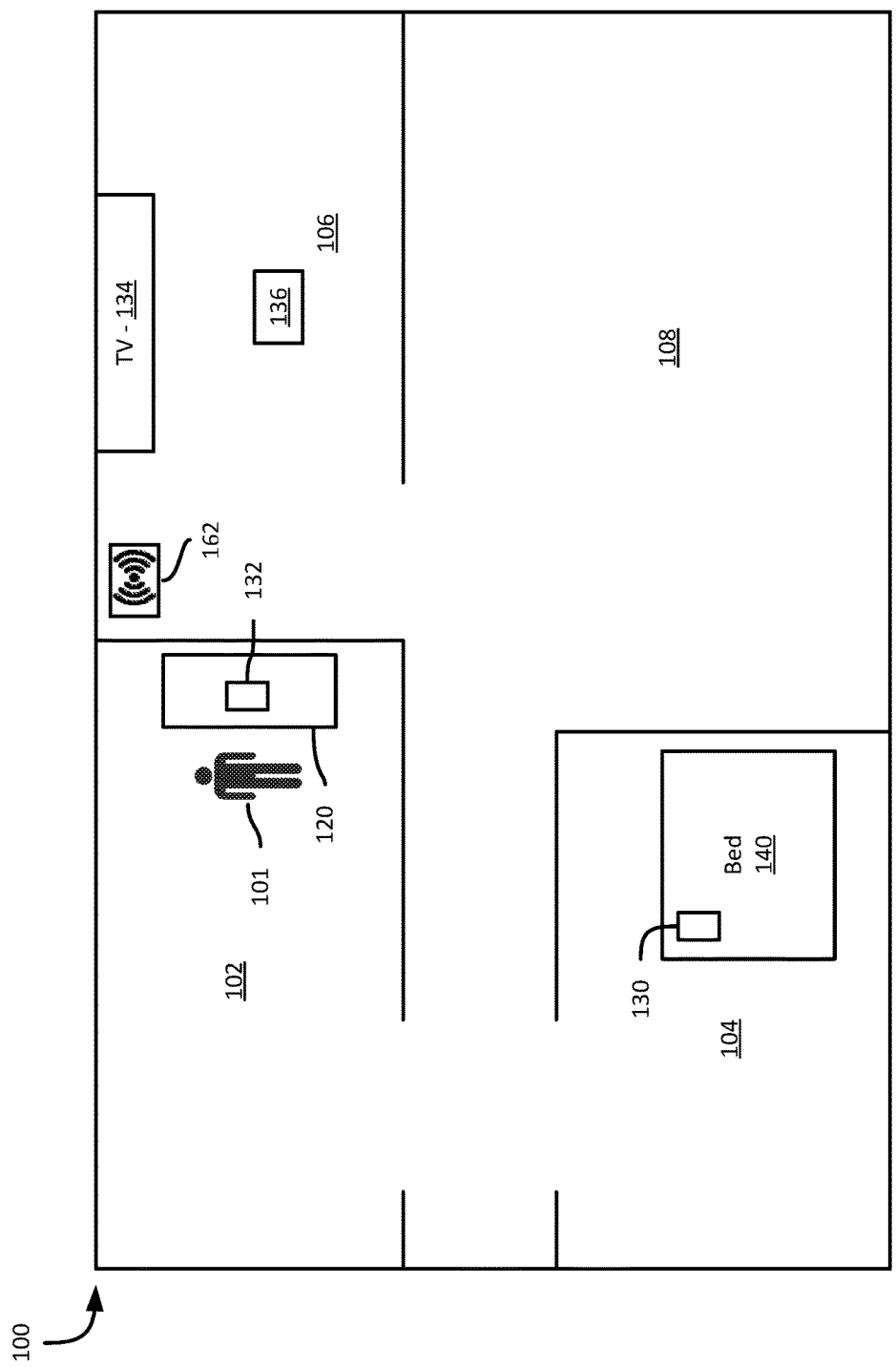
FIG. 1 shows a layout of an example environment suitable for intelligent routing of notifications of incoming voice communication requests.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The present disclosure describes techniques for routing a notification of an incoming voice or video communication request (or "call") to an electronic device. A user may have a communication device, such as smartphone or laptop computer, that can receive voice or video calls from another device. When such a call is received, the communication device itself may output a notification, such as a ring tone or a vibration, or it may request that another device output the notification. The notification may be used to draw the user's attention to that device, which the user may then use to answer and participate in the incoming call, rather than searching for the communication device itself.

For example, a user's smartphone may be connected to multiple different devices that may allow the user to participate in the incoming call, such as a headset or a tablet. But rather than outputting a notification from each of these connected devices, as well as the smartphone itself, the smartphone may instead attempt to determine only one device to output the notification. To do so, the smartphone may request that each of the connected devices (including the smartphone) activate a microphone and begin listening for the user's voice. If the user's voice is recognized near one of the connected devices (or the smartphone itself), the smartphone may request only that device output the notification. Alternatively, the smartphone may request the connected devices to each activate a camera to capture images to try to optically locate the user. The smartphone may then determine whether the user is identified in any of the captured images, and if so, request that the corresponding device output the notification. In some examples, the communication device may also detect distances to each detected person from each of the connected devices, thereby providing an additional metric by which to select a device to output the notification. Further, in some examples, the communication device may be able to discriminate between different persons' voices or faces, and prioritize the detected persons to output a notification using a device in proximity to the most important detected person.

Particular implementations of the subject matter described in this disclosure can be implemented to realize one or more of the following potential advantages. By selecting only one device to output an incoming call notification, the user's smartphone will not inundate the user with notifications from multiple devices at the same time, which are all attempting to notify the user of the same incoming call. Further, by only outputting a notification using one device, systems according to this disclosure may avoid disturbing other individuals at the same location. In addition, by using audio or video sensors to attempt to locate the user, the communication device may select a device that is likely to catch the user's attention when the notification is output. Additionally, by only outputting a notification using one device, excess power consumption to output the redundant notifications by other devices may be avoided.

FIG. 1 shows a layout of an example environment suitable for intelligent routing of notifications of incoming voice communication requests. In particular, FIG. 1 shows an example layout of a user's home 100, which has multiple rooms 102-108. In this example, the user 101 left the smartphone 130 on a bed 140 in the bedroom. The user 101 is currently at the desk 120 in the study 102, browsing the web on a tablet 132. In the living room 106, there is a smart TV 134 (such as a television configured to execute voice communication or video communication applications) and an IOT hub 136, which provides voice-controlled on-demand virtual assistant features, such as shopping features, weather and traffic information, music and video features, etc. Each of these devices is connected to the smartphone 130, such as via a Bluetooth ("BT") connection or a WiFi connection using the WiFi access point ("AP") 162.

When an incoming call is detected by the smartphone 130, it determines whether it should handle the incoming call itself or whether to route the call to another connected device 132-136. To do so, it determines which of the connected devices 132-136 is capable of handling the audio or video communications. For example, a suitable device may have a speaker, a microphone, an image sensor, such as a camera, etc. In this example, each of the user's tablet 132, smart TV 134, and IOT hub 136, as well as the smartphone 130 itself, can interface with the user 101 to handle voice calls because each has a microphone and a speaker. For each of these devices 130-136, the smartphone 130 may provide a ring notification; however, this may result in a large number of devices 130-136 ringing throughout the user's home or office, which may be irritating to the user 101 or to other people in the vicinity.

To reduce the annoyance or inconvenience to the user 101 of multiple devices ringing simultaneously throughout the user's house, the smartphone 130 may instead attempt to determine which of the available connected devices 132-136 is nearest to the user 101 and only instruct that device to provide a ring notification. In this example, the smartphone 130 identifies the device nearest the user 101 without ringing any of the connected devices 132-136 or the smartphone 130 itself, and before answering the call. To do so, the smartphone 130 identifies all the connected devices 132-136 that are connected to the smartphone 130 and then commands each to activate its microphone to attempt to detect the user's voice. The smartphone 130 also may activate its own microphone to attempt to detect the user's device. Each of the devices 130-136 then activates its respective microphone and begins receiving audio signals. Each device 130-136 then either performs voice recognition on those received audio signals itself, or forwards the received audio signals to the smartphone 130 or to another computing device to perform voice recognition. One or more of the devices 130-136 also may obtain other information about the obtained audio signals, such as signal to noise ratios ("SNR"), an amplitude of one or more detected voices, etc., which may be used to determine a relative distance from the respective device to the user 101.

If the user's voice is recognized based on the received audio signals, the connected device or devices that obtained the audio signals is then identified by the smartphone 130. The smartphone 130 determines which of these devices is the best one to ring. If only one connected device recognized the user 101, such as the tablet 132 in this example, that device may be selected. If more than one connected device recognizes the user 101—for example, if the user 101 were in the living room near the smart TV 134 and the IOT hub 136—the smartphone 130 may select one of those devices 134-136 based on different factors, such as strength of the respective audio signals, the SNR of the respective audio signals, etc. Further, if more than one user is detected, such as the user 101, the user's spouse, the user's child(ren), etc., the smartphone 130 may then, based on a priority of the various users, select the user to whom the call should be directed.

For example, if the user 101 and one of the user's children are detected, the smartphone 130 may select the device that detected the user 101, or is closest to the user 101. Or, if the user's spouse and one of the user's children are detected, but not the user 101, the device that detected the spouse may be selected. After selecting one of the devices 130-136, the smartphone 130 commands the selected device to ring and commands the other devices to disable their microphones. The user 101 may then interact with the ringing device to answer the phone call.

Figure 2:
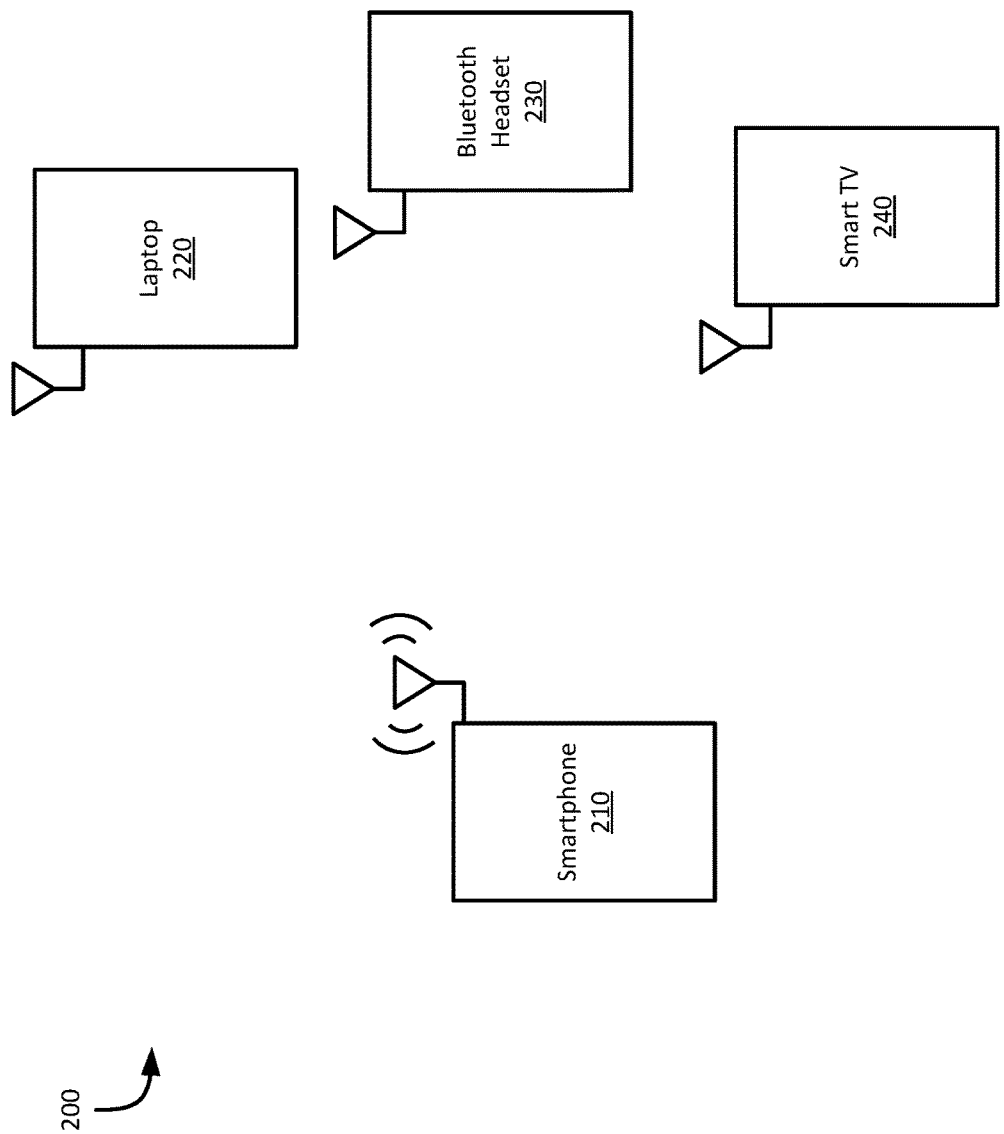
FIG. 2 shows an example system for intelligent routing of notifications of incoming voice communication requests.

FIG. 2 shows an example system 200 for intelligent routing of notifications of incoming voice communication requests. In this example, a smartphone 210 is connected to a cellular network and is capable of receiving cellular phone calls. In addition, the smartphone 210 is connected to multiple other devices: a laptop 220, a BT headset 230, and a smart TV 240. In this example, the other devices 220-240 are connected to the smartphone 210 via a previously-established pairing or other peer-to-peer relationship. For example, the BT headset 230 is connected to the smartphone 210 based on successfully pairing with the smartphone 210 via the BT protocol. Thus, in some examples, a connected device may be one that has established communications with the other smartphone 210 rather than one that is simply connected to a common network, such as a local area network. For example, while the smartphone 210 and the laptop 220 may each be connected to the wireless AP 162 shown in FIG. 1, if they have not previously established communications with each other to exchange messages or data, they are not "connected."

It should be noted that devices that have previously established a connection with each other, which may not be connected at a given time, but are registered with the smartphone 210 and are available for a connection may be dynamically connected upon the occurrence of predetermined events. For example, the smartphone 210 and the laptop 220 may have previously established a connection with each other, such as to allow the laptop 220 to handle user interface functions of telephone calls received by the smartphone 210. In such an arrangement, the smartphone 210 handles the signaling and communications with a cellular network, while the laptop 220 uses its speakers and microphone to allow a user to engage in a telephone call being handled by the smartphone 210 or to dial numbers using the laptop's touchscreen or keyboard. However, if no call is active, the connection between the laptop 220 and smartphone 210 may be suspended and terminated. However, if a new call were to be detected by the smartphone 210, the smartphone 210 may attempt to establish a connection to the laptop 220. In such a scenario, the laptop 220 is instead available for a connection. The smartphone 210 may then re-establish a connection to enable a user to take an incoming voice call via the laptop 220.

In this example, the smartphone 210 is connected to each of the other devices 220-240 and maintains a list or registry of devices that are connected or have previously connected or registered with the smartphone 210. The list may identify each device and may include information about the capabilities of the devices. For example, the list for the connected devices 220-240 in this example may include data such as the following:

| ID | Connection Satus | Audio Output | Audio Input | Video Output | Video Input | Voice Recognition | Image Recognition |
|---|---|---|---|---|---|---|---|
| 220 | Suspended/Available | Yes | Yes | Yes | Yes | Yes | Yes |
| 230 | Connected | Yes | Yes | No | No | No | No |
| 240 | Suspended/Available | Yes | Yes | Yes | Yes | Yes | Yes |
| 250 | Not Available | Yes | Yes | No | No | Yes | No |

In the example list above, each of devices 220-240 is represented, as well as their respective connection status. In addition, device 250 (not shown) is known by the smartphone 210 but is not currently available. For example, it is powered off or out of range, and has audio input and output capabilities, but not video input and output capabilities.

It should be appreciated that the smartphone 210 may simultaneously employ multiple different wireless technologies to establish connections with various devices. In this example, the smartphone 210 can connect to the laptop 220 and the smart TV 240 using a WiFi connection, while it is connected to the BT headset 230 via a BT connection. Still other types of communications protocols or techniques may be employed in different examples, including WiFi, BT, BT low-energy ("BLE"), Zigbee, IEEE 802.15.4, etc. Any or all of these different technologies may be employed independently or concurrently according to different examples.

Figure 3:
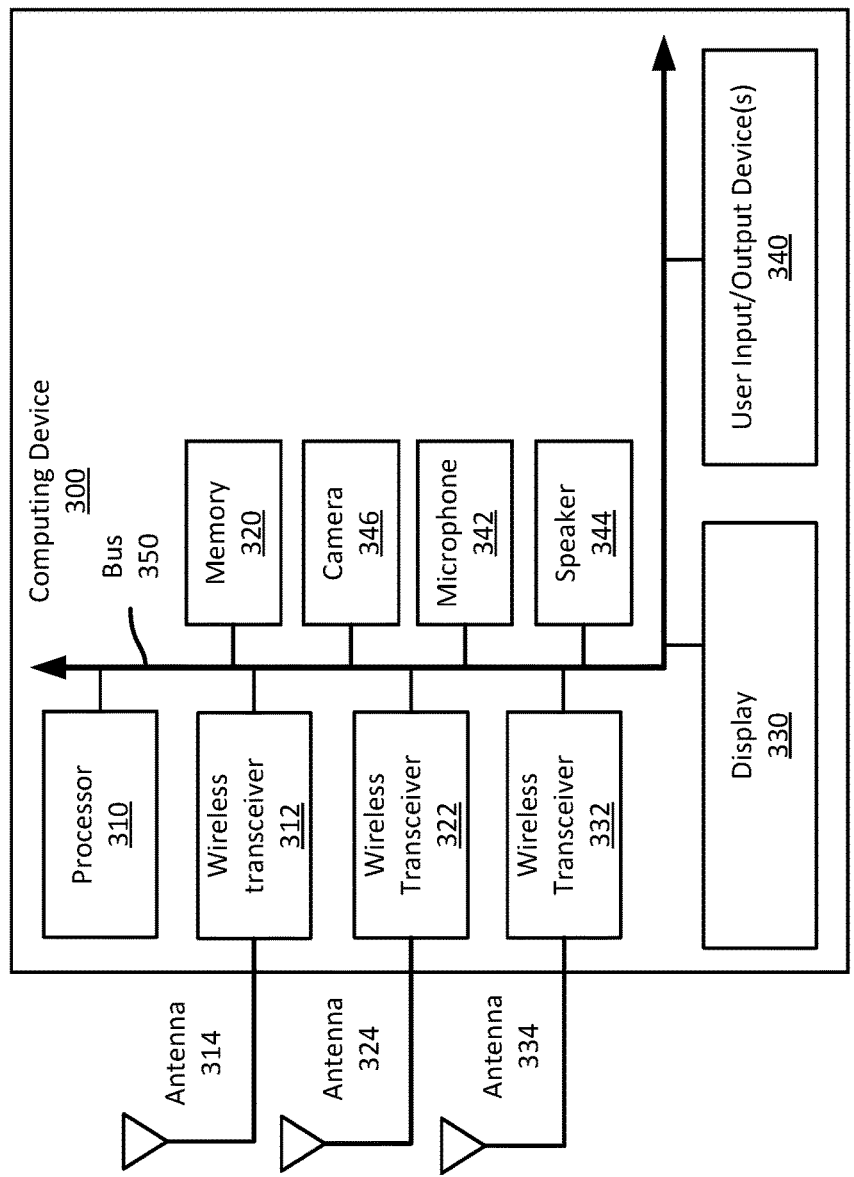
FIGS. 3 and 4 show example computing devices for intelligent routing of notifications from incoming voice communication requests.

FIG. 3 shows an example computing device 300 for intelligent routing of notifications from incoming voice communication requests. The example computing device 300 includes a processor 310, memory 320, a display, user input devices 340, a microphone 342, a speaker 344, and a camera 346 in communication with each other via bus 350. In addition, the computing device 300 includes three wireless transceivers 312, 322, 332 and associated antennas 314, 324, 334. The processor 310 is configured to execute processor-executable program code stored in the memory 320 to execute one or more methods for intelligent routing of notification of incoming voice communication requests according to this disclosure.

In this example, the computing device 300 is a smartphone. However, the computing device may be any computing device configured to receive and handle audio or audio/visual ("video") communications over a communications network with a remote computing device constituting the other end of the voice or video communication. Example computing devices according to this disclosure may be laptop computers, desktop computers, tablets, phablets, satellite phones, cellular phones, dedicated video conferencing equipment, IOT hubs, virtual assistant device (such as Alexa®, Home®, etc.), wearable devices (such as smart watches, earbuds, headphones, Google Glass®, etc.), in-vehicle entertainment or communication systems, home security systems, or any device having an interface to a communications network and suitable input and output devices. It should be appreciated that reference to a voice communication or a voice call includes video communications, while reference to voice-only communication or voice-only call excludes such video communications.

In this example, the smartphone 300 is equipped with a wireless transceiver 312 and antenna 314 configured to communicate with a cellular network using any suitable communications technology as discussed above.

In this example, the smartphone 300 may receive incoming voice communication requests from a remote device connected to a cellular network. After the remote device initiates the cellular phone call, the smartphone 300 may receive an indication from the cellular network of the incoming phone call. In some examples, the incoming voice communication request may be another form of audio or video communication, such as a video conferencing request (FaceTime®, Skype®, Hangouts®, etc.), a walkie-talkie request (such as via a Sprint/Nextel Direct Connect protocol, etc.), a satellite phone call, etc. Such voice or video communication request may be received over any suitable network. For example, a voice communication request may be received from a local area network ("LAN"); wide area network ("WAN"), such as the Internet; metropolitan area network ("MAN"); point-to-point or peer-to-peer connection; etc. Communication between the computing devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

A voice or video communication generally refers to a real-time or near-real time communications between users of different computing devices connected via one or more intervening communications network, which enables the users to converse with each other substantially as they could if they were in a face-to-face conversation. For example, conventional phone calls and video conference calls are voice or video communications according to this disclosure.

In addition to the wireless transceiver 312 and antenna 314, the smartphone 300 also includes additional wireless transceivers 322, 332 and antennas 324, 334 configured for BT communications and WiFi communications, respectively. Thus, the smartphone 300 is able to connect to one or more BT devices, such as a BT headset or earbud, as well as a WiFi access point ("AP").

The smartphone 300 also includes a display 330 and user input devices 340. Suitable user input devices include touch-sensitive surfaces, such as touch screens, buttons, knobs, rocker switches, directional pads, mice, keyboards, microphones, etc. Suitable output devices include speakers, display devices, braille output devices, haptic output devices, etc.

Figure 4:
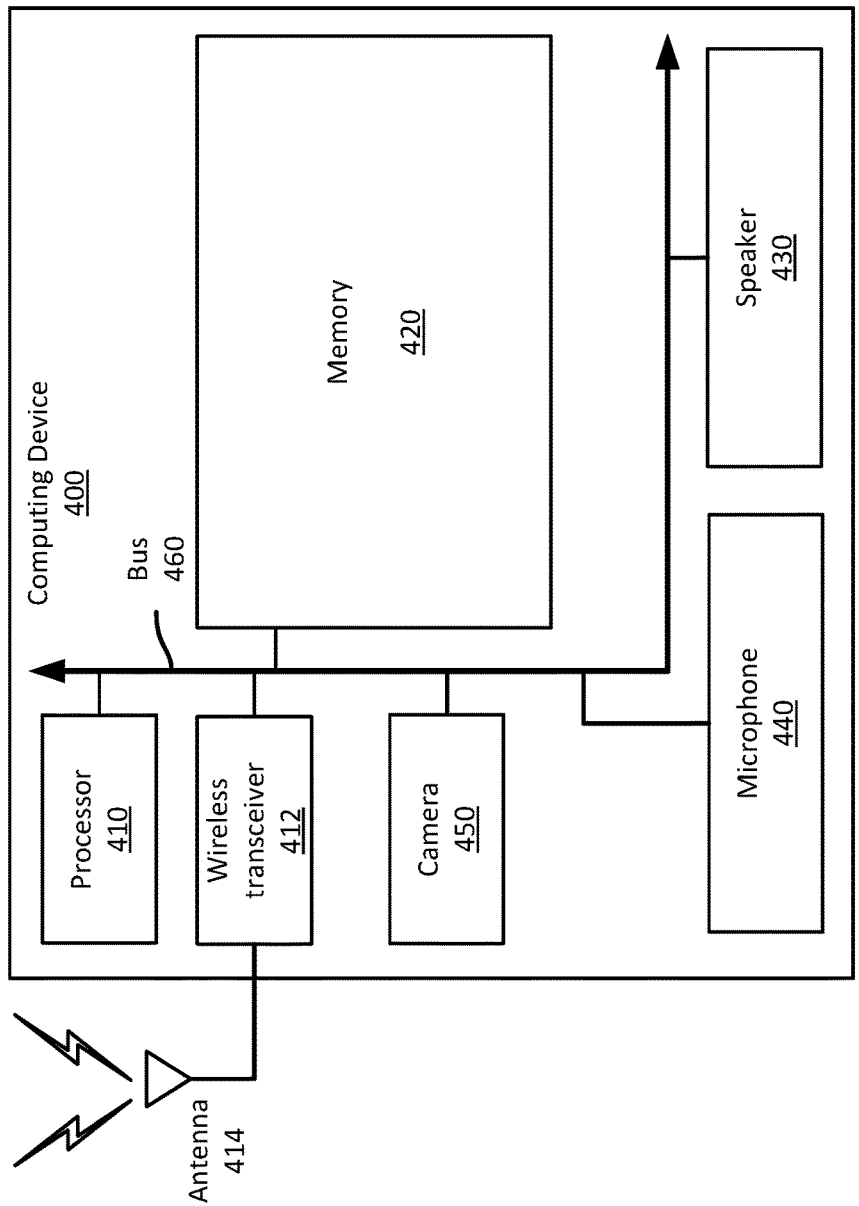

FIG. 4 shows an example computing device 400 that may be connected to the computing device 300 shown in FIG. 3. As discussed above, connected devices may include a wide variety of electronic devices, including any of those discussed above; however, connected devices suitable for providing a user interface to a user to engage in a voice or video communication may include features needed to enable such interactions.

In this example, the computing device 400 includes a processor 410 in communication with memory 420 via bus 460. In addition, the computing device 400 includes a wireless transceiver 412 and associated antenna 414. In addition, the computing device 400 includes input and output devices that may be used to engage in a voice or video communication. In this example, the computing device 400 includes a speaker 430, a microphone 440, and a camera 450. Thus, this example computing device 400 may be suitable for engaging in both voice and video communications. Some example computing devices may lack a camera 450, while having a microphone 440 and a speaker 430.

In this example, the example connected computing device 400 provides remote input and output interfaces for the computing device 300 of FIG. 3 that handles the protocol aspects of the electronic voice communication with the calling device. For example, if the computing device 300 is a smartphone, while the connected computing device 400 is a laptop, the smartphone handles the signaling and other messaging needed to maintain a cellular call, while providing the audio output stream to the laptop to be played via the laptop's speakers. Similarly, the laptop provides an audio output stream to the smartphone to be transmitted via the cellular network to the far end of the cellular phone call. Thus, the connected computing device 400 in this example provides the user interface portion of the voice or video communication, while the computing device 300 handles the mechanics of establishing and maintaining the voice or video communication with the calling device.

Figure 5:
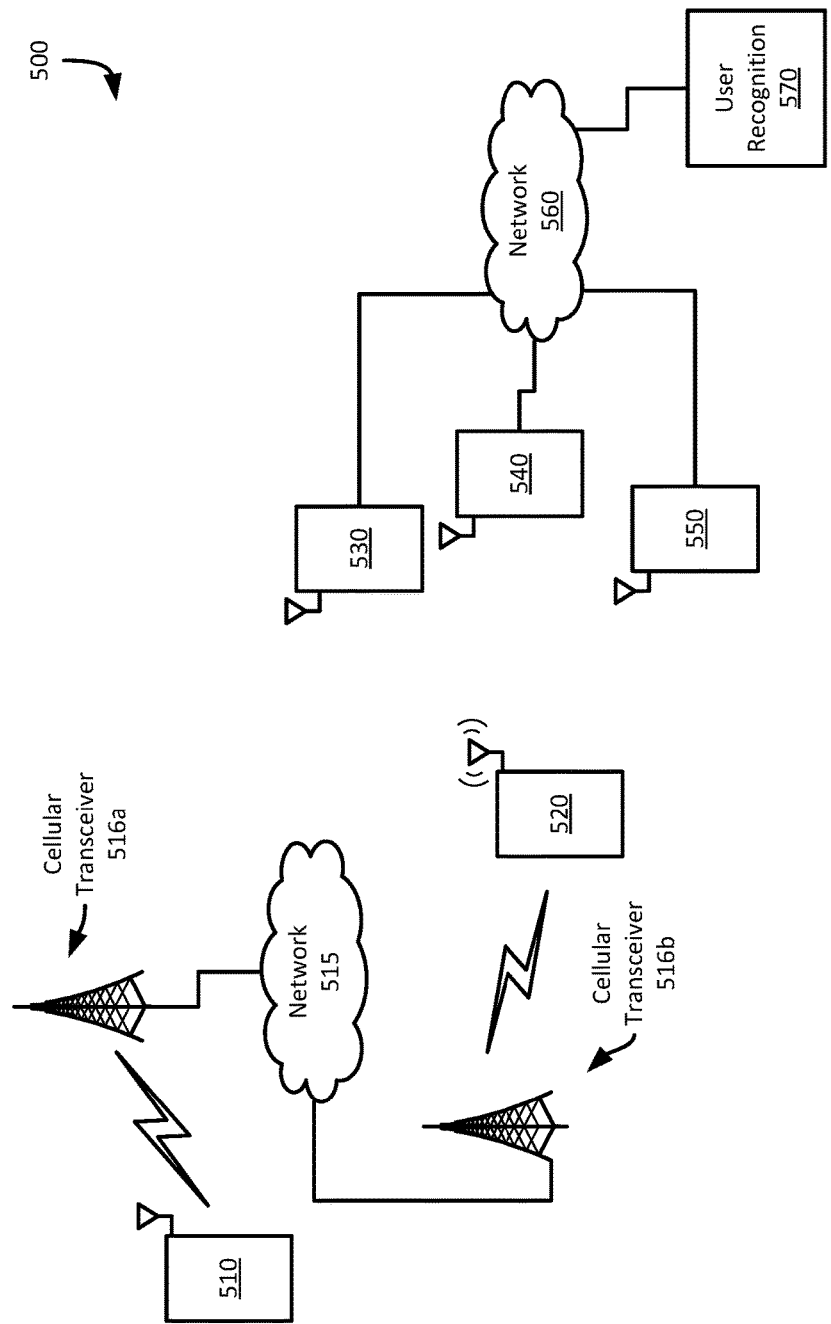
FIG. 5 shows an example system for intelligent routing of notifications of incoming voice communication requests.

FIG. 5 shows an example system 500 for intelligent routing of notifications of incoming voice communication requests. In this example, a cellular device 510 places a video call to smartphone 520 using the cellular network 515 via cellular transceiver 516a. The smartphone 520 is connected to multiple other devices: a laptop 530, a BT headset 540, and a smart TV 550. In this example, the other devices 530-550 are registered with or connected to the smartphone 520 via a previously-established pairing or other peer-to-peer relationship generally as discussed above with respect to FIG. 2.

In this example, when the smartphone 520 receives the incoming voice call from the cellular network 515 via cellular transceiver 516b, it identifies the connected devices 530-550 and identifies which are capable of handling a video call. In this example, the smartphone 520 identifies the laptop 530 and smart TV 550 as both having microphones, speakers, and cameras, and thus each is capable of handling a video call. In contrast, the BT headset 540 has a microphone and speakers, but lacks a camera. Thus, the smartphone 520 identifies it as being capable of handling voice calls, but not video calls.

In this example, the smartphone 520 then activates its own microphone and also commands the laptop 530 and smart TV 550 to activate their respective microphone(s) to detect whether the user is near the smartphone 520 or to the identified connected devices 530, 550. As the devices 520, 530, 550 receive audio signals from their activated microphones, they perform voice recognition to attempt to recognize one or more voices based on the received audio signals. In addition, each device 520, 530, 550 also may obtain additional information, such as SNR or voice signal strength, that may be used to determine a relative distance from the respective device to the person or persons.

In this example, the smartphone 520 and the laptop 530 each have voice recognition capabilities; however, the smart TV 550 does not. Thus, the smart TV 550 connects using network 560 to a remote computing device 570 that provides voice recognition, and then streams received audio signals to the remote computing device 570. The remote computing device 570 then performs one or more voice recognition techniques on the received audio signals to attempt to recognize one or more user voices. If the remote computing device 570 recognizes one or more user voices, it responds to the smart TV 550 with information identifying the recognized voices. For example, the remote computing device 570 may provide a name, user ID, user profile, or other information to the smart TV to identify each recognized voice. In addition, the remote computing device 570 may provide information related to the voice information, such as a quality or confidence rating of the voice recognition, SNR information, etc. For example, the audio signals streamed to the remote computing device 570 may include only faint voice information, such as if the speaker is distant from the microphone, or may include background noise that interferes with the voice recognition techniques. Thus, a SNR value may be low or a confidence rating for the recognized voice(s) may be low. Such information may be provided to the smart TV 550 along with information about one or more recognized voices. The smart TV 550 may then provide information to the smartphone 520 identifying the recognized voices as well as any quality, SNR, or other information received from the remote computing device 570.

Similarly, the laptop 530, after performing its own voice recognition techniques, provides to the smartphone 520 any information identifying any recognized voices. Further, in some examples, the laptop 530 also may provide additional information, such as SNR information, confidence information, etc.

After receiving information about recognized voices from each of the identified connected devices 530, 550, and performing voice recognition on its own obtained audio signals, the smartphone 520 determines whether the user was identified by any of the devices 520, 530, 550. If the user was only identified by one device, the smartphone 520 can then transmit a notification to that device to play a voice call notification to alert the user of the incoming voice call. If the user was identified by multiple devices, the smartphone 520 can determine which of the devices to select, and transmit the notification to that device, or it can select multiple devices and transmit a notification to each such device. After a device outputs the voice call notification, the user can then answer the call using that device.

While in this example, the smartphone 520 only commanded the laptop 530 and the smart TV 550 to activate their microphones because the incoming communication was identified as a video call, in some examples, the smartphone 520 also may command the BT headset 540 as well, despite it lacking a camera. For example, the smartphone 520 can either accept the video call and then only provide audio signals to the BT headset 540, or convert the voice call to a voice-only call, which may then make the BT headset 540 a suitable connected device to provide a user interface for the call.

Further, in some examples, after receiving a notification of an incoming voice communication, the smartphone 520 may command the connected devices 530-550 to activate their microphones, but also may, or instead, command the laptop 530 and smart TV 550 to activate their respective cameras to try to identify the user, or other individuals. For example, the laptop 530 may activate a built-in webcam and capture one or more images. The laptop 530 may then attempt to identify one or more individuals within the image(s), and if any individuals are identified, attempt to recognize the identified individuals and determine relative distances to one or more of the recognized individuals. For example, the laptop 530 may employ one or more face identification and facial recognition techniques to identify and recognize individuals from one or more captured images. In some examples, the laptop 530 may instead transmit one or more captured images to a remote computing device 570, which then attempts to identify and recognize one or more individuals in the captured images. The remote computing device 570 may then provide to the laptop 530 an indication of one or more individuals recognized within the image(s) or an indication that no individuals were recognized. In some examples, the smart TV 550 or other connected devices may perform a similar technique to visually identify and recognize one or more individuals in one or more captured images and, in some examples, determine a distance to the one or more recognized individuals based on the captured images.

After attempting to identify and recognize the user or other individuals, the connected devices 530-550 may transmit information to the smartphone 520 identifying any recognized individuals, whether recognized visually or audibly, or other information such as a determined distance to the user from the connected device, SNR information, etc. The smartphone 520 may then employ such information to select one of the connected devices, or to select itself, as the device to output a call notification. After which, the smartphone 520 commands the selected device to output a call notification, such as a ring tone, a flashing light or screen, a vibration, etc.

Figure 6:
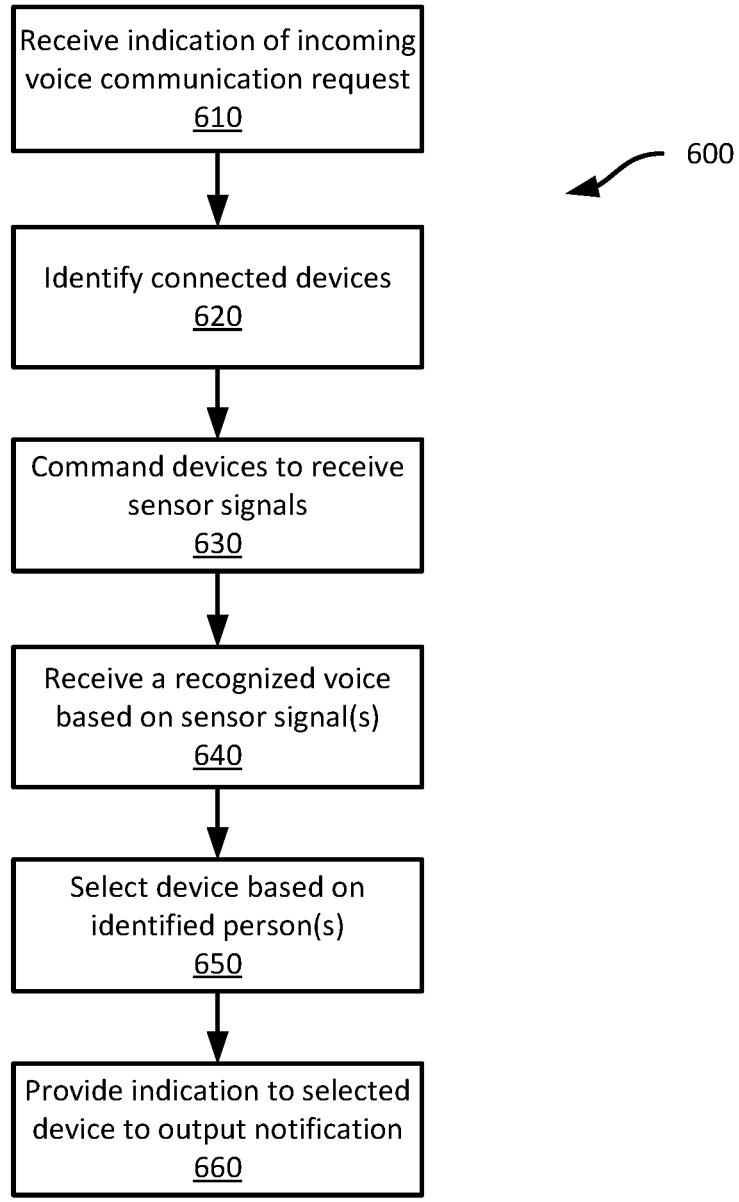
FIGS. 6 and 7 show example methods for intelligent routing of notifications of incoming voice communication requests.

FIG. 6 shows an example method 600 for intelligent routing of notifications of incoming voice communication requests. The example method 600 will be described with respect to the example system 500 of FIG. 5. However, it should be appreciated that example methods according to this disclosure may be employed by any suitable devices, systems, or methods according to this disclosure.

At block 610, the smartphone 520 receives an indication of an incoming voice communication request. In this example, cellular device 510 places a voice call to the smartphone 520 using the cellular network 515 via cellular transceiver 516a. The smartphone 520 receives the indication of the incoming voice call from the cellular network 515 via cellular transceiver 516b. Any suitable cellular technology may be employed in various examples, such as those discussed above.

In this example, the cellular device 510 places a standard cellular voice call. Thus, the cellular network 515 provides an indication of the incoming cellular voice call using the cellular protocol employed by the smartphone 520. But in some examples, the cellular device 510 may initiate a voice communication using a voice or video call application (or "app") executed by the cellular device 510, which data is carried by the cellular network as a data stream, such by using a networking protocol encapsulated within one or more data transmission protocols provided by the cellular network. However, any suitable application that allows users to initiate a voice or video call to another device, or receive a voice or video call by another device may be employed. Such applications may include features to provide indications to a called device that a voice or video communication is requested, which may then initiate a notification to the user of the called device of the request.

While in this example, the called device is a smartphone 520, any other suitable electronic device capable of receiving a voice or video communication request from a remote device may be employed, such as discussed above with respect to FIG. 4.

Further, while this example discusses a voice call placed over a cellular network, any suitable communications network or voice or video communication request may be employed, such as discussed above with respect to FIG. 3.

In response to the indication and before requesting a device to output a notification, the method 600 proceeds to block 620. In this example, the smartphone proceeds to block 620 without requesting any device to output a notification.

At block 620, the smartphone 520 identifies one or more connected devices having one or more suitable input devices and one or more suitable output devices. Suitable input and output devices may be identified based on the type of voice communication request. Suitable input and output devices for a voice-only communication request include one or more microphones and one or more speakers. Suitable input and output devices for a video communications request include one or more microphones, one or more speakers, and, optionally, one or more cameras and video display devices. In some examples, an incoming video communication request may be downgraded to a voice-only communication, or may be refused entirely, if no suitable connected devices (or the called device itself) have a camera and a video display device.

In this example, the smartphone 520 has three devices connected to it: a laptop 530, a BT headset 540, and a smart TV 550; however, any number of devices may be connected to the smartphone 520. As discussed above, a connected device may be statically or dynamically connected to the smartphone 520. For example, the BT headset 540 may be statically connected as long as it remains powered on and in range of the smartphone 520. Thus, the connection is actively maintained, even when no audio data is exchanged between the smartphone 520 and the BT headset 540. However, some devices may be dynamically connected to the smartphone 520.

For example, the laptop 530 may be in communication with LAN via a WiFi AP to which the smartphone 520 is also connected. The smartphone 520 may detect the presence of the laptop 530 and recognize the laptop 530 as a device authorized to connect to the smartphone 520, but may not initiate a connection with the laptop 530 unless a triggering event occurs. For example, the user may open a music player application on the smartphone 520, which may access a media library stored on the laptop 530. A connection to the laptop 530 may then be dynamically established to provide access to the media library. Similarly, in this example, the laptop 530 may provide audio or video interfaces to the smartphone 520 for voice or video calls handled by the smartphone 520 via the laptop 530. In this example, the smart TV 550 is also dynamically connectable by the smartphone 520, such as when an incoming voice communication is received.

Thus, at block 620, the smartphone 520 identifies devices that are connected to the smartphone 520 or that are available for a dynamic connection to the smartphone 520.

In addition to identifying devices that are connected or available for dynamic connection, the smartphone 520 determines the capability of each device to serve as an interface device for the incoming voice communication request. In this example, the incoming voice communication request indicates a voice-only communication, thus the smartphone 520 identifies all connected or connectable devices that have a microphone and speakers. In some examples, if a video communication request is received, the smartphone 520 identifies all devices having a microphone, speaker, camera, and display device. Such information may be stored in a database or other registry of known devices generally as described above with respect to FIG. 2.

For example, when the smartphone 520 connects to a new device, it may request device capabilities from the device, such as microphone, speakers, camera, display screen, etc. Information regarding such capabilities received from the new device may be stored by the smartphone 520 in a record associated with the device, such as based on a unique identifier for the device (MAC address, IMEI, etc.). At a later time, when the smartphone 520 connects to the device again, it may access the device's record to determine which capabilities the device has. In some examples, however, the smartphone 520 may determine a device's capabilities each time it connects to the device. For example, device capabilities may change over time, or a user may disable one or more input or output devices, such as by muting speakers or disabling a camera.

If the smartphone 520 is unable to identify a connected device with suitable input and output devices, the method may end and the smartphone 520 itself may output a notification of the incoming voice communication, such as by ringing. Alternatively, if no suitable input or output devices are identified for a video call, but one or more connected devices is capable of handling a voice-only call, the smartphone 520 may downgrade the communication request from a video communication request to a voice-only communication request, or provide a notification to the calling device that video capabilities are not supported. If the smartphone 520 downgrades the video call to a voice call, it may then identify one or more connected devices capable of handling voice-only calls.

At block 630, the smartphone 520 commands each identified device to obtain sensor signals using one or more suitable input devices. In this example, the smartphone 520 transmits a command to the BT headset 540 to activate its microphone to obtain audio signals. In addition, the smartphone 520 initiates a dynamic connection to each of the laptop 530 and the smart TV 550. After initiating each dynamic connection, the smartphone 520 commands the respective connected device 530, 550 to activate its microphone to obtain audio signals. In some examples, the smartphone 520 itself also may activate its microphone or camera to obtain sensor signals.

In some examples, if the incoming voice communication request indicates a video communication request. In one such example, the smartphone 520 may command each identified device to obtain audio signals using one or more microphones, video signals using one or more cameras, or both audio and video signals. For example, the smartphone 520 may transmit a command to the laptop 530 to obtain audio signals from its microphone and to obtain video signals from its camera. Further, in some examples, the smartphone 520 may command one or more devices 520-550 to obtain sensor signals both from a microphone and a camera even in the context of a voice-only communication request. Such a technique may provide multiple types of sensors that may be used to recognize one or more persons, which may increase the odds of recognizing a person.

Figure 7:
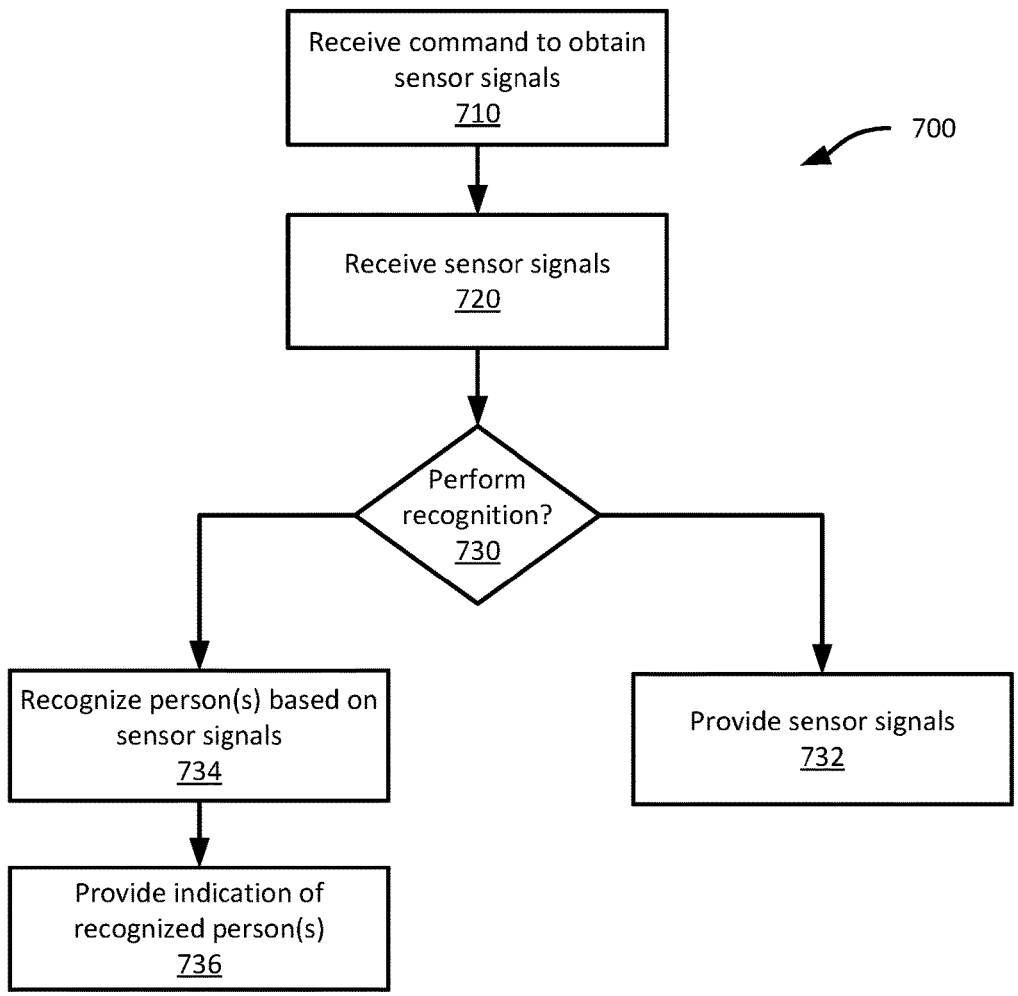

In response to receiving such a command, each of the connected devices 530-550 may perform a method according to this disclosure to obtain sensor signals, and either recognize one or more persons based on the sensor signals or provide the sensor signals to the smartphone 520. One such example method 700 is shown in FIG. 7, which is described in more detail below.

At block 640, the smartphone 520 receives an indication of one or more recognized persons based on one or more sensor signals. In this example, the smartphone 520 receives an indication of a recognized person from one or more of the devices 530-550, which determined a recognized person as described below with respect to FIG. 7. In some examples, however, the smartphone 520 may receive sensor signals from one or more of the devices 530-550 and perform one or more recognition techniques using the received sensor signals from each device that provided them. After performing the recognition technique(s), the smartphone 520 receives the indication of the recognized person as an output of the respective recognition techniques.

Examples of suitable recognition techniques include voice recognition, facial recognition, object recognition, etc. Received audio signals may be provided to a voice recognition technique to attempt to recognize one or more voices recorded within the audio signals, while received video signals may be provided to a facial recognition technique to identify one or more persons faces. Indications of the recognized voices or faces may be received by the smartphone 520 from such recognition techniques. For example, the indications may include a name, a user profile ID, or some other identifier recognizable by the smartphone 520 of one or more persons. It should be understood that multiple persons may be identified by one or more of the connected devices 530-550, or by the smartphone 520 itself.

In some examples, one or more of the devices 520-550 may attempt to determine a distance from the respective device to one or more recognized persons. A distance determination may be based on audio signals, such as by determining SNR information or voice signal strength, or images and a detected size of the person within the captured images. For example, voice signal strength may decrease the further a person is from a microphone. Thus, a device may employ a correspondence of voice signal strength to distance to determine a distance to the individual. It should be appreciated that distance does not necessarily refer to an objective distance measurement, such as in feet or meters. Rather, distance may be a coarse measurement, such as "near" or "far" based on a predetermined threshold value for voice signal strength, SNR, etc. In some examples, a distance may be inferred by the smartphone 520 based on different SNR or voice signal strength measurements from multiple devices. By comparing the respective SNR or voice signal strength measurements, the smartphone 520 may determine a ranking of the distance of the respective devices from one or more recognized individuals by ordering the devices according to their respective SNR or voice signal strength measurements. Such an ordering may provide relative distance information, such as "nearest" and "farthest" for one or more devices.

At block 650, the smartphone 520 selects a device, whether the smartphone 520 itself or one of the connected devices 530-550, based on the identified person or persons. In this example, the smartphone 520 is associated with its owner, thus an incoming voice communication request is most likely directed to the owner of the device. Thus, if the owner of the smartphone 520 was recognized, any device 520-550 that provided sensor signals used to recognize the owner may be a candidate for selection. If only one device 520-550 provided such sensor signals, the smartphone 520 selects that device. However, if multiple devices 520-550 provided such sensor signals, the smartphone 520 may select a device 520-550 based on one or more factors.

Such factors may include a detected distance of a device 520-550 to the owner. For example, the laptop 530 may have obtained sensor signals used to recognize the owner, but the sensor signals had a low SNR or were at a low amplitude, indicating the owner was likely distant from the laptop 530. At the same time, the smart TV 550 may have obtained sensor signals with an SNR greater than the SNR from the laptop 530, or an amplitude greater than those obtained by the laptop 530, potentially indicating that the owner was closer to the smart TV 550 than the laptop 530. In such an example, the smartphone 520 may select the smart TV 550. Alternatively, the smartphone 520 may receive distance information from one or more devices, such as described above.

In some examples, one or more devices 520-550 may recognize the owner from multiple sensor inputs. For example, the owner may have been recognized based on sensor signals obtained both by the laptop's camera and microphone. In contrast, the owner may have been recognized by sensor signals from the smart TV's microphone, but not from its camera. Thus, the smartphone may 520 select the laptop based on more of the laptop's sensor inputs indicating the presence of the owner than the smart TV's.

In some examples, the smartphone 520 may select a device based on priority information. Priority information may be associated with one or more recognized persons or one or more devices 520-550. For example, the smartphone 520 may maintain information about known persons, such as the owner of the device, the owner's spouse, the owner's child(ren), etc. One or more of such known persons may have associated priority information that can be used to select a device 520-550. Such priority information may indicate a preference for persons to notify about incoming voice calls, or may identify one or more persons who should not be notified of incoming voice calls. For example, the smartphone 520 may have a priority of 1 associated with the owner of the device, a priority value of 2 associated with the owner's spouse, and a priority value of 3 for each of the owner's children. Thus, when the smartphone 520 receives information about recognized persons from one or more devices 520-550, it may determine a priority for each device based on which persons were recognized by which device. For example, if the laptop 530 recognizes the owner, while the smart TV recognizes the owner's spouse, the smartphone 520 may select the laptop 530 as the priority associated with the owner is greater than the priority associated with the owner's spouse.

In some examples, priority information may be associated with one or more devices. For example, the smartphone's owner may provide preferences relating to which devices should be used to answer voice calls. For example, the owner may establish the smartphone with the highest priority, a tablet device (not shown) with a second highest priority, the laptop 530 and smart TV 550 with a third highest priority, and the BT headset 540 with a fourth highest priority. Thus, if multiple devices recognize the owner, the smartphone 520 may then select the device that both recognized the owner and has the highest priority.

In some examples, if priority information associated with multiple persons or multiple devices indicate they have the same priority, the smartphone 520 may select a device based on other factors, such as distance to the recognized individuals, etc. In some examples, though, the smartphone 520 may select multiple devices indicating the same priority levels or information.

At block 660, the smartphone 520 transmits a command to the selected device to output a notification of the voice communication request. A notification may include an audible notification, a visual indication, a tactile indication, or any combination of these. The command may include one or more notification identifiers to identify a type of notification to output or information describing the notification itself, such as an audio signal, image, tactile sensation, etc. In some examples, the command may be a command to the device to output the notification without any information describing the notification to be output. In addition to outputting the notification, the smartphone 520 also may transmit one or more commands to the devices that were not selected to discontinue obtaining sensor signals.

In some examples, however, no device may respond to the smartphone 520 identifying a recognized person with a predetermined time. Such a predetermined time may be a fixed number of rings, a fixed amount of time, or a relative time based on the amount of time before the incoming voice communication request is re-routed to another service, such as a voice message service.

In such a scenario, the smartphone 520 may output a command to all devices 520-550 to output the notification, or the smartphone 520 may only output the notification itself. In some examples, the smartphone 520 may command devices having a priority above a threshold to output a notification of the incoming voice request.

FIG. 7 shows an example method 700 for intelligent routing of notifications of incoming voice communication requests. In this example, the method 700 will be described with respect to the example system 500 shown in FIG. 5 and with respect to the example method 600 shown in FIG. 6. However, it should be appreciated that example methods according to this disclosure may be employed by any suitable devices, systems, or methods according to this disclosure.

At block 710, a connected device 530-550 receives a command to obtain sensor signals. For example, the connected device 530-550 may receive a command to activate a microphone to obtain audio signals or to activate a camera to obtain video signals. In this example, the command identifies one or more types of sensors to be activated and a duration during which to obtain sensor information. If the connected device 530-550 is configured to perform a recognition technique, discussed in more detail below, the command also may include a command to provide information identifying recognized persons, or a deadline by which such information is to be provided.

If the connected device 530-550 is not configured to perform a recognition technique, the command may specify a technique for providing sensor information to the smartphone 520. Suitable techniques may include streaming sensor signals to the smartphone 520 or providing a file containing one or more sensor signals or encoded sensor signals. In some examples, sensor signals may be encoded using one or more lossy or lossless encoding techniques, such as full rate, half rate, adaptive multi-rate, MPEG level-3 (mp3), etc. vocoders for audio sensor signals, or bitmap, JPEG, GIF, etc. for images, or MPEG-4, H.264, etc. for video signals.

In response to receiving the command, the connected device 530-550 activates the identified sensor(s), such as the microphone or camera. In some examples, the connected device 530-550 may be unable to activate one or more sensors. For example, the user may have disabled either or both, such as via a configuration setting. In some examples, the activation command may be disregarded based on such a configuration, and the method 700 may terminate. However, in some examples, the activation command may temporarily override the configuration and activate the sensor(s) for purposes of performing a method according to this disclosure.

At block 720, the connected device 530-550 receives sensor signals from the activated sensor(s). For example, the laptop 530 may receive a stream of audio information from its microphone and a stream of images from its camera. In the case of a camera, in some examples, the camera may provide video at a standard frame rate, such as at 24, 25, or 30 frames per second, or it may capture images at a specified rate, such as 1 per second, or it may only capture a specified number of images. Such sensor signals, after being received, may be stored in a memory for further processing. For example, the audio information may be recorded to an audio file in memory or on a non-volatile storage medium. Images received from the camera may be stored individually in separate files or stored as a video file.

At block 730, the connected device 530-550 determines whether it will perform a recognition technique or will provide the obtained sensor signals to the smartphone 520 for processing. If the connected device 530-550 is configured to perform a recognition technique, the method 700 proceeds to block 734; otherwise, the method 700 proceeds to block 732.

At block 732, the connected device 530-550 provides its sensor signals to the smartphone 520. For example, the connected device 530-550 may transmit an audio file, an image file, or a video file to the smartphone 520. In some examples, the connected device 530-550 may stream sensor signals, or information extracted from sensor signals, to the smartphone 520 in real-time. In some examples, such sensor signals may be encoded according to one or more encoding techniques, such as described above with respect to block 630 of FIG. 6. After providing such sensor signals, the method 700 may then terminate.

In this example, the connected device 530-550 will continue to provide sensor signals until it receives a subsequent command to discontinue obtaining sensor signals. In some examples, however, the connected device 530-550 will provide sensor signals for a predetermined period of time or until a predetermined number of sensor signals have been provided. For example, the connected device may provide sensor signals for up to five seconds or may provide up to ten images.

At block 734, the connected device 530-550 recognizes one or more persons based on the received sensor signals. In some examples, the connected device 530-550 itself may execute one or more recognition techniques, such as a voice recognition technique or a facial recognition technique. Suitable voice or facial recognition techniques may employ neural networks, including deep neural networks; hidden Markov models ("HMM"); spectral or cepstral analysis techniques; dynamic time warping techniques; etc. The connected device 530-550 may provide one or more sensor signals to the voice or facial recognition technique and receive an indication of the identity of the person or persons associated with the inputted sensor signals.

In some examples, the connected device 530-550 itself does not perform the recognition technique, but instead provides the sensor signals to a remote computing device 570 other than the smartphone 520 that executes one or more recognition techniques. Such a remote computing device 570 may then respond to the connected device 530-550 with an indication of an identity of the person or persons associated with the inputted sensor signals.

Because in some examples the connected devices 530-550 may obtain sensor signals over a period of time, the connected devices 530-550 may perform multiple iterations of recognition techniques to attempt to identify one or more persons over the period of time the sensor signals are obtained.

At block 736, the connected devices 530-550 provide an indication of one or more recognized persons, or an indication that no persons were recognized, to the smartphone 520. For example, the connected devices 530-550 may provide a name, a user identification number or code, a user profile, etc., to the smartphone 520. In some examples, the connected devices 530-550 may provide multiple indications of recognized persons. As discussed above, the connected devices 530-550 may obtain sensor signals over a period of time and may iteratively perform recognition techniques on obtained sensor signals. As persons are recognized, the connected devices 530-550 may provide indications of the recognized persons to the smartphone 520.

In this example, the connected devices 530-550 will continue to obtain sensor signals and perform recognition techniques until commanded to stop by the smartphone 520 or until a predetermined threshold from the command received at block 710 is reached.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method, comprising:
   receiving, by an electronic device, an indication of an incoming voice communication request;
   in response to the indication and before requesting a device to output a notification:
      identifying one or more devices connected to the electronic device, each of the one or more devices comprising an audio input device and an audio output device;
      requesting each identified device to detect audio signals using its respective audio input device;
   receiving a voice based on a first audio signal, the first audio signal received by one of the one or more devices;
   determining a distance to the voice;
   selecting a first device of the one or more devices based on the determined distance to the voice; and
   providing a signal to the first device to output a notification indicating the incoming voice communication request.

2. The method of claim 1, wherein the electronic device is a smartphone, and wherein the one or more devices comprises at least one of a laptop computer, a tablet, a smart television, a Bluetooth earphone, an internet-of-things ("IOT") device, or an IOT hub.

3. The method of claim 1, wherein the incoming voice communication request is an incoming cellular telephone call or an incoming video conferencing call.

4. The method of claim 1, further comprising recognizing the voice based on one or more audio signals using a voice recognition technique, and wherein selecting the first device is further based on the recognized voice.

5. The method of claim 1, wherein receiving the voice comprises receiving a plurality of voices; and further comprising recognizing one or more voices of the plurality of voices using a voice recognition technique.

6. The method of claim 5, further comprising:
   determining a priority for each recognized voice; and
   identifying the recognized voice having the highest priority, and
   wherein selecting the first device is further based on the recognized voice having the highest priority.

7. The method of claim 1, wherein each device has an associated priority, and selecting the device is further based on the respective priority of each device.

8. A method, comprising
   receiving, by an electronic device, an indication of an incoming voice communication request;
   in response to the indication and before requesting a device to output a notification:
      identifying one or more devices connected to the electronic device, each of the one or more devices comprising an image sensor;
      requesting each identified device to capture one or more images using its respective image sensor;
      obtaining the captured one or more images;
      recognizing a person in at least one of the captured images;
   selecting a first device of the one or more devices based on the recognized person; and
   providing a signal to the first device to output a notification indicating the incoming voice communication request.

9. The method of claim 8, further comprising:
   recognizing a plurality of persons in one or more of the captured images;
   determining a priority for each recognized person; and
   identifying the recognized person having the highest priority, and
   wherein selecting the first device is further based on the recognized person with the highest priority.

10. A non-transitory computer-readable medium comprising processor-executable program code configured to cause a processor of an electronic device to:
    receive an indication of an incoming voice communication request;
    in response to the indication and before requesting a device to output a notification:
       identify one or more devices connected to the electronic device, each of the one or more devices comprising an audio input device and an audio output device;
       request each identified device to detect audio signals using its respective audio input device;
    receive a voice based on a first audio signal, the first audio signal received by one of the one or more devices;
    determine a distance to the voice;
    select a first device of the one or more devices based on the determined distance to the voice; and
    provide a signal to the first device to output a notification indicating the incoming voice communication request.

11. The non-transitory computer-readable medium of claim 10, wherein the incoming voice communication request is an incoming cellular telephone call or an incoming video conferencing call.

12. The non-transitory computer-readable medium of claim 10, further comprising processor-executable program code configured to cause a processor to recognize the voice based on one or more audio signals using a voice recognition technique and wherein the selection of the first device is further based on the recognized voice.

13. The non-transitory computer-readable medium of claim 10, wherein the voice comprises a plurality of voices; and further comprising processor-executable program code configured to cause a processor to recognize one or more voices of the plurality of voices using a voice recognition technique.

14. The non-transitory computer-readable medium of claim 13, further comprising processor-executable program code configured to cause a processor to:
    determine a priority for each recognized voice; and
    identify the recognized voice having the highest priority, and
    select the first device based on the recognized voice having the highest priority.

15. The non-transitory computer-readable medium of claim 10, wherein each device has an associated priority, and further comprising processor-executable program code configured to cause a processor to select the first device based on the respective priority of each device.

16. A non-transitory computer-readable medium comprising processor-executable program code configured to cause a processor of an electronic device to:
    receive an indication of an incoming voice communication request;
    in response to the indication and before requesting a device to output a notification:
        identify one or more devices connected to the electronic device, each of the one or more devices comprising an image sensor;
        request each identified device to capture one or more images using its respective image sensor;
        obtain the one or more captured images;
        recognize a person in at least one of the captured images;
        select a first device of the one or more devices based on the recognized person; and
    provide a signal to the first device to output a notification indicating the incoming voice communication request.

17. The non-transitory computer-readable medium of claim 16, further comprising processor-executable program code configured to cause a processor to:
    recognize a plurality of persons in one or more of the captured images;
    determine a priority for each recognized person; and
    identify the recognized person having the highest priority, and
    select the first device based on the recognized person with the highest priority.

18. An electronic device comprising:
    a microphone;
    a speaker;
    a network interface;
    a non-transitory computer-readable medium; and
    a processor in communication with the microphone, the speaker, the network interface, and the non-transitory computer-readable medium, and configured to execute processor-executable program code stored in the non-transitory computer-readable medium configured to cause the processor to:
        receive an indication of an incoming voice communication request via the network interface;
        in response to the indication and before requesting a device to output a notification:
            identify one or more devices connected to the electronic device, each of the one or more devices comprising an audio input device and an audio output device;
            request each identified device to detect audio signals using its respective audio input device;
        receive a voice based on a first audio signal, the first audio signal received by one of the one or more devices;
        determine a distance to the voice;
        select a first device of the one or more devices based on the determined distance to the voice; and
        provide a signal to the first device to output a notification indicating the incoming voice communication request.

19. The device of claim 18, wherein the incoming voice communication request is an incoming cellular telephone call or an incoming video conferencing call.

20. The device of claim 18, wherein the processor is further configured to execute processor-executable program code to recognize the voice based on one or more audio signals using a voice recognition technique and wherein the selection the first device is further based on the recognized voice.

21. The device of claim 18, wherein the voice comprises a plurality of voices; and wherein the processor is further configured to execute processor-executable program code to recognize one or more voices of the plurality of voices using a voice recognition technique.

22. The device of claim 21, wherein the processor is further configured to execute processor-executable program code to:
    determine a priority for each recognized voice; and
    identify the recognized voice having the highest priority, and
    select the first device based on the recognized voice having the highest priority.

23. The device of claim 18, further comprising an image sensor, and wherein the processor is further configured to execute processor-executable program code to:
    in response to the indication and before requesting a device to output a notification:
        for each of the one or more devices having an image sensor, request each device to capture one or more images using its respective image sensor; receive the one or more images;
    recognize a person in at least one of the images; and
    select the first device further based on the recognized person.

24. The device of claim 23, wherein the processor is further configured to execute processor-executable program code to:
    recognize a plurality of persons in one or more of the images;
    determine a priority for each recognized person; and
    identify the recognized person having the highest priority, and
    select the first device based on the recognized person with the highest priority.

25. The device of claim 18, wherein each device has an associated priority, and wherein the processor is further configured to execute processor-executable program code to select the first device based on the respective priority of each device.

26. An apparatus comprising:
    means for receiving an indication of an incoming voice communication request;
    means for identifying one or more devices connected to the apparatus in response to the indication and before requesting a device to output a notification, each of the one or more devices comprising an audio input device and an audio output device;
    means for requesting each identified device to detect audio signals using its respective audio input device in response to the indication and without outputting the notification;
    means for receiving a voice based on a first audio signal, the first audio signal received by one of the one or more devices;
    means for determining a distance to the voice;
    means for selecting a first device of the one or more devices based on the determined distance to the voice; and
    means for providing a signal to the first device to output a notification indicating the incoming voice communication request.

\* \* \* \* \*